(12) United States Patent
Shimizu

(10) Patent No.: US 8,191,591 B2
(45) Date of Patent: Jun. 5, 2012

(54) PNEUMATIC TIRE

(75) Inventor: Akiyoshi Shimizu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 691 days.

(21) Appl. No.: 12/305,579

(22) PCT Filed: Jun. 19, 2007

(86) PCT No.: PCT/JP2007/062331
§ 371 (c)(1),
(2), (4) Date: Dec. 18, 2008

(87) PCT Pub. No.: WO2007/148694
PCT Pub. Date: Dec. 27, 2007

(65) Prior Publication Data
US 2009/0165910 A1    Jul. 2, 2009

(30) Foreign Application Priority Data

Jun. 19, 2006  (JP) ................................ 2006-168934

(51) Int. Cl.
*B60C 11/13* (2006.01)
(52) U.S. Cl. ................................. 152/209.18
(58) Field of Classification Search ............... 152/209.1, 152/209.3, 209.15, 209.18, 209.21, 209.24, 152/902
See application file for complete search history.

(56) References Cited

U.S. PATENT DOCUMENTS

| | | | | |
|---|---|---|---|---|
| 5,535,798 A * | 7/1996 | Nakamura | ............... | 152/209.21 |
| 6,315,018 B1 * | 11/2001 | Watanabe | ................ | 152/209.21 |
| 2005/0081971 A1 * | 4/2005 | Heinen | ....................... | 152/209.1 |
| 2009/0272473 A1 * | 11/2009 | Kojima | .................... | 152/209.15 |

FOREIGN PATENT DOCUMENTS

| EP | 0 917 970 A2 | 5/1999 |
|---|---|---|
| EP | 0 989 000 A2 | 3/2000 |
| JP | 3-271006 A | 12/1991 |
| JP | 8-175113 A | 7/1996 |
| JP | 9-132007 A | 5/1997 |

(Continued)

OTHER PUBLICATIONS

European Search Report for EP 07 76 7189, dated Jun. 18, 2010 (6 pages).

*Primary Examiner* — Eric Hug
(74) *Attorney, Agent, or Firm* — Sughrue Mion, PLLC

(57) ABSTRACT

A pneumatic tire maintaining excellent traction performance for the entire life of the tire. The tire (10) has blocks (18) each demarcated by both a circumferential groove formed in the tread and lateral grooves crossing the circumferential groove, and also has recessed parts (20). Each recessed part (20) is formed in at least one of those both wall surfaces of each block (18) that are oriented to the lateral direction of the tire, and the circumferential width (C) of each recessed part (20) is increased from the tread side of the block (18) toward the radially inside of the tire. Because the edge effect of the blocks (18) at the portions between the lateral grooves and the recessed parts (20) can be maintained in an excellent state even if the wear of the tire (10) progresses, the edge effect of the entire blocks can be maintained in an excellent state, and excellent traction performance can be maintained for the entire life of the tire.

6 Claims, 7 Drawing Sheets

FOREIGN PATENT DOCUMENTS

| | | |
|---|---|---|
| JP | 9-183303 A | 7/1997 |
| JP | 11-291718 A | 10/1999 |
| JP | 11-321238 A | 11/1999 |
| JP | 2001-180231 A | 7/2001 |
| JP | 2001-294021 A | 10/2001 |
| JP | 2003-312212 A | 11/2003 |
| JP | 2005-145127 A | 6/2005 |
| JP | 2005-297845 A | 10/2005 |
| WO | 02/060705 A1 | 8/2002 |
| WO | 2007/058162 A1 | 5/2007 |

* cited by examiner

PNEUMATIC TIRE

TECHNICAL FIELD

The present invention relates to a pneumatic tire, and in particular relates to a pneumatic tire with improved traction performance suitably applied to pneumatic tires for construction vehicles used in mining and on construction sites.

RELATED ART

Traction performance has always been important for pneumatic tires for construction vehicles in order to secure hill climbing ability, since they are often used on rough roads (for example in mining and on construction sites). (See, for example, Patent Documents 1 to 6.)

Patent Document 1: Japanese Patent Application Laid-Open No. 11-291718
Patent Document 2: Japanese Patent Application Laid-Open No. 2001-180231
Patent Document 3: Japanese Patent Application Laid-Open No. 8-175113
Patent Document 4: Japanese Patent Application Laid-Open No. 9-132007
Patent Document 5: Japanese Patent Application Laid-Open No. 2003-312212
Patent Document 6: Japanese Patent Application Laid-Open No. 2005-145127

DISCLOSURE OF THE INVENTION

Problem to be Solved by the Invention

However, since the above pneumatic tires for construction vehicles have mainly aimed to increase the performance when new, emphasis has been placed on securing an edge component, but the traction performance falls off when the tread becomes somewhat worn, even if an edge component similar to when new is secured. This leads to difficulties in maintaining excellent traction performance over the entire life of the tire. The pneumatic tires of Patent Documents 1 to 6 also do not maintain excellent traction performance over the entire life of the tire.

The present invention is made in consideration of the above circumstances and an objective of the present invention is to provide a pneumatic tire that maintains excellent traction performance over the entire life of the tire.

Method of Solving the Problem

In order to achieve the above objective, the pneumatic tire according to claim 1 of the present invention includes: blocks demarcated by a circumferential groove formed in the tread and lateral grooves (tire width direction grooves) crossing the circumferential groove; and a recessed portion formed in at least one of the wall surfaces at the two ends in the tire width direction (lateral direction) of each of the blocks, the circumferential width of the recessed portion increasing from the tread surface side of the block toward the inside of the tire radially.

It has previously been recognized that with traction performance on rough roads the contribution of force applied should be large for the lug groove edge of the tread blocks (so-called edge component) to penetrate the ground (referred to below as the edge effect). As a result of dedicated research the inventor responsible for contriving the present invention has discovered that this edge effect is lowered due to the tread gauge decreasing, even if the edge component are secured at the same level as that of the tire when new, consequently lowering the traction performance.

The inventor has further analyzed this edge effect in detail, and concluded that the change in the edge effect is not dependent on how large or small the blocks are, but depends on the ratio of the circumferential length of the block in the tire circumferential direction to the block gauge.

Explanation will now be given of changes to the edge effect. In a new tire the gauge of the blocks is thick, and therefore when a load acts on a block, the block is squashed and the wall surfaces of the block bulge. When a block is moving out of contact with the ground and when it is starting to bite into the ground, a high contact pressure acts on the edge component (trailing ends and leading ends) of the side wall surfaces of the blocks squashed and expanded in the tire circumferential direction, and an excellent edge effect is obtained. In contrast, in a tire which has become worn, the blocks are not easily squashed even when a load acts thereon since the gauge of the blocks has been reduced. When the block is moving out of contact with the ground and when it is starting to bite into the ground, the edge effect is therefore lower than that when new, since there is a lower contract pressure acting on the edge component of the side wall surfaces of the blocks. In particular, when the block is moving out of contact with the ground and when it is starting to bite into the ground, the edge component (trailing end and leading end) are the portions that move out of contact with the ground and start to bite into the ground with a new tire, but wearing has progressed in a tire it is tread near to the edge component (trailing end and leading end) that moves out of contact with the ground and starts to bite into the ground. This difference appears as a significant difference in the edge effect therebetween, with a worn tire having inferior traction performance to that of a new tire.

The present inventor has discovered from the above that in order to maintain an excellent state of traction performance for the entire life of the tire, it is important to maintain any change in the above ratio of the block circumferential length to the block gauge to a small amount, arriving at the completion of the pneumatic tire of the present invention.

Explanation will now be given of the operation of the pneumatic tire of a non-limiting embodiment of the present invention.

The gauge of blocks decreases with the progression in wear of a tire, and the ratio of the block circumferential length to the block gauge increases. As this wear progresses, the circumferential width of recessed portions provided in the wall surfaces of the blocks (the length of the recessed portions in the tire circumferential direction) starts to increase. Namely, the circumferential length of short block portions, the regions between the lateral groove and the recessed portions, starts to decrease. The ratio of the circumferential length of the short block portions to the gauge of the short block portions is consequently maintained at a small amount, and an excellent state of the edge effect of the short block portions is maintained.

The edge effect of the block as a whole is thereby maintained in an excellent state and excellent traction performance is maintained. The circumferential width of the recessed portions also increases on progression from the tread side of the blocks toward the inside in the tire radial direction, so that an excellent state of the ratio of the circumferential length of the short block portions to the gauge of the short block portions is always maintained. Due to the above, the pneumatic tire maintains an excellent edge effect and maintains excellent traction performance for the entire life of the tire.

In a non-limiting embodiment of the pneumatic tire, the length between an end portion at the innermost side of the recessed portion in the tire radial direction and the tread surface is longer at the recessed portions at the outside in the tire width direction than at the recessed portions at the inside in the tire width direction.

Explanation will now be given of the operation of the above pneumatic tire. The blocks toward the outside in the tire width direction are more readily worn by input forces such as side forces, and there is a large reduction in the edge effect. However a balance can be achieved by the configuration.

In a non-limiting embodiment of the pneumatic tire, the recessed portion is only formed on an outside wall surface in the tire width direction of the blocks that are at the outermost position in the tire width direction.

Explanation will now be given of the operation of the above pneumatic tire. As stated above, the blocks toward the outside in the tire width direction have a larger amount of wear of their edges due to input forces such as side forces, and this becomes even more significant for the blocks on the outside in the tire width direction. Sufficient effect is therefore obtained even by providing recessed portions only on the outside wall surface in the tire width direction of the blocks that are at the outermost position in the tire width direction.

In a non-limiting embodiment of the pneumatic tire, the increase in circumferential width of the recessed portion toward the inside in the tire radial direction is not at a constant rate.

Explanation will now be given of the operation of the above pneumatic tire. The aim of the present invention is to maintain the edge effect by changing the circumferential length of the short block portions. However, depending on the shape of the blocks, the hardness of the tread rubber and the base rubber, etc., there are cases where the optimum circumferential length of the short block portions to the gauge of the short block portions is not always a proportional relationship to the gauge of the short block portions. The optimum circumferential length of the short block portions can also be obtained even in such cases by changing the rate of increase in the circumferential width of the recessed portion.

In a non-limiting embodiment of the pneumatic tire, if the length between the innermost end portion of the recessed portion in the tire radial direction and the tread surface is designated A, and the length in the tire circumferential direction of a region between the recessed portion of the block and the lateral groove in the range from the tread surface of the block up to 80% of the depth of the lateral groove is designated B, then $0.8 < B/A < 2.5$ is satisfied.

Explanation will now be given of the operation of the above pneumatic tire. As stated above, the gauge of the blocks decreasing relative to the circumferential length of the blocks is a factor lowering the traction performance between a partially worn state and the fully worn state of the tire. However if this ratio becomes too large, other properties (wear durability) of the tire such as chunking deteriorate, particularly in tires used for heavy loads such as in construction vehicles. In relation to this phenomenon, the present inventor carried out tests relating to the ratio of the circumferential length of the blocks to the gauge of the blocks, from the standpoint of chucking, and the evaluation resulted in the discovery that this ratio is preferably from 0.8 to 2.5. Namely, if circumferential direction length $B/A \geq 2.5$ then insufficient edge effect is obtained and traction performance falls off, and if $0.8 \geq B/A$ then the block chunking properties deteriorate. Consequently, the relationship between A and B preferably satisfies $0.8 < B/A < 2.5$.

In a non-limiting embodiment of the pneumatic tire, in a lateral cross-section (tire width direction cross-section) of the tire, either the depth of the recessed portion is the same at the outside in the tire radial direction as at the inside in the tire radial direction, or the depth is deeper at the inside in the tire radial direction than at the outside in the tire radial direction.

Explanation will now be given of the operation of the above pneumatic tire. If the depth of the recessed portions is shallower at the inside in the tire radial direction than at the outside in the tire radial direction, then recessed portions get shallower along with the progression of wear in the tire, and sufficient edge effect becomes no longer obtainable. It is therefore preferable for the depth of the recessed portions to be either the same at the outside in the tire radial direction as at the inside in the tire radial direction, or to be deeper at the inside in the tire radial direction than at the outside in the tire radial direction.

In a non-limiting embodiment of the pneumatic tire, at least one portion of the recessed portion has a circular arced shape in a tire width direction cross-section.

Explanation will now be given of the above pneumatic tire. In the tire, since the recessed portions have a circular arced shape, when the recessed portions are exposed by wearing, deformation of the wall surface of the recessed portions so as to bulge out in the tire width direction is suppressed, and excessive lowering in the compressive rigidity of the end portions of the tread in the tire width direction is suppressed, and a high edge effect can be achieved.

Effect of the Invention

Due to the above, the pneumatic tire of the present invention has the excellent effect of maintaining excellent traction performance for the entire life of the tire.

BEST MODE OF IMPLEMENTING THE INVENTION

First Exemplary Embodiment

Configuration

Figure 1:
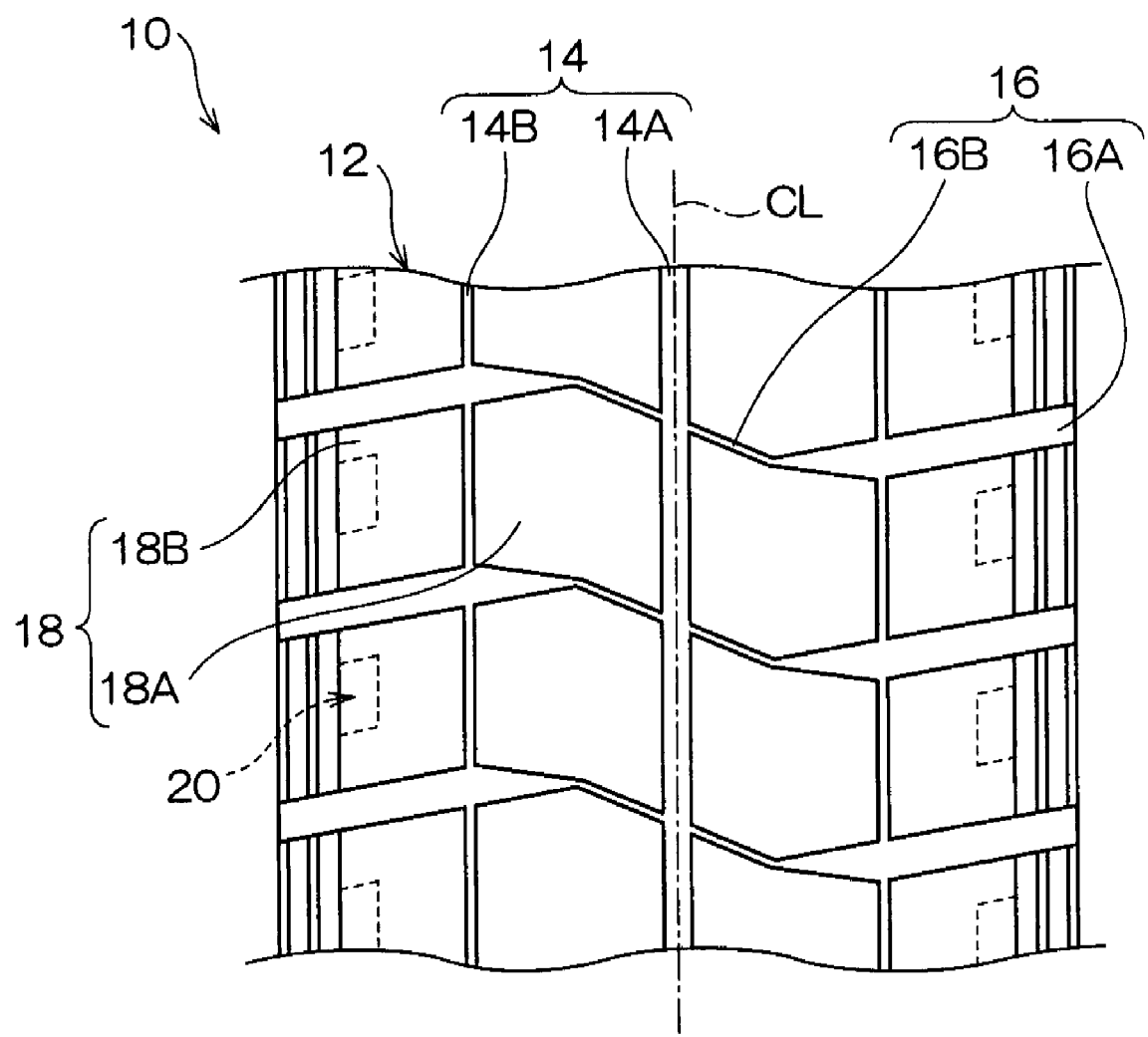
FIG. 1 is a figure showing a tread pattern of a pneumatic tire according to a first exemplary embodiment.

Explanation will now be given of a first exemplary embodiment of the pneumatic tire of the present invention, with reference to FIGS. 1 to 3. The pneumatic tire 10 of the present exemplary embodiment (referred to below simply as tire 10) is a pneumatic tire for construction vehicles with a tire size of 40.R00R57.

While omitted in the drawings, the tire 10 is configured to include a pair of bead cores, a carcass extending in a torus shape straddling these bead cores, a belt provided at the outside of a crown portion of the carcass in the tire radial direction, and a tread 12 provided further to the outside than the belt in the tire radial direction of the belt.

Circumferential Grooves, Lateral Grooves

As shown in FIG. 1, the tread 12 is provided with plural circumferential grooves 14 extending in the tire circumferential direction, and with plural lateral grooves (tire width direction grooves) 16 that extend in the tire width direction and cross the circumferential grooves 14. The circumferential grooves 14 include a circumferential groove 14A extending along the equatorial plane CL, and a circumferential groove 14B provided on each side of the circumferential groove 14A. The lateral grooves 16 include lateral grooves 16A extending from portions at each edge of the tread 12 toward the equatorial plane CL up to the vicinity of the tread center, and lateral grooves 16B cutting across the equatorial plane CL and connecting between end portions of the lateral grooves 16A that extend out from the two edge portions.

The tread pattern of the tire 10 of the first exemplary embodiment is a rotationally symmetric pattern with the equatorial plane CL as the axis of symmetry. Namely, the tire 10 is a tire without a designated direction of rotation.

Blocks, Recessed Portions

As shown in FIG. 1, there are plural blocks 18 demarcated by the circumferential grooves 14 and the lateral grooves 16. These blocks 18 include blocks 18A demarcated to the equatorial plane CL side of the circumferential grooves 14B, and blocks 18B demarcated to the outside in the tire width direction of the circumferential grooves 14B.

Figure 2:
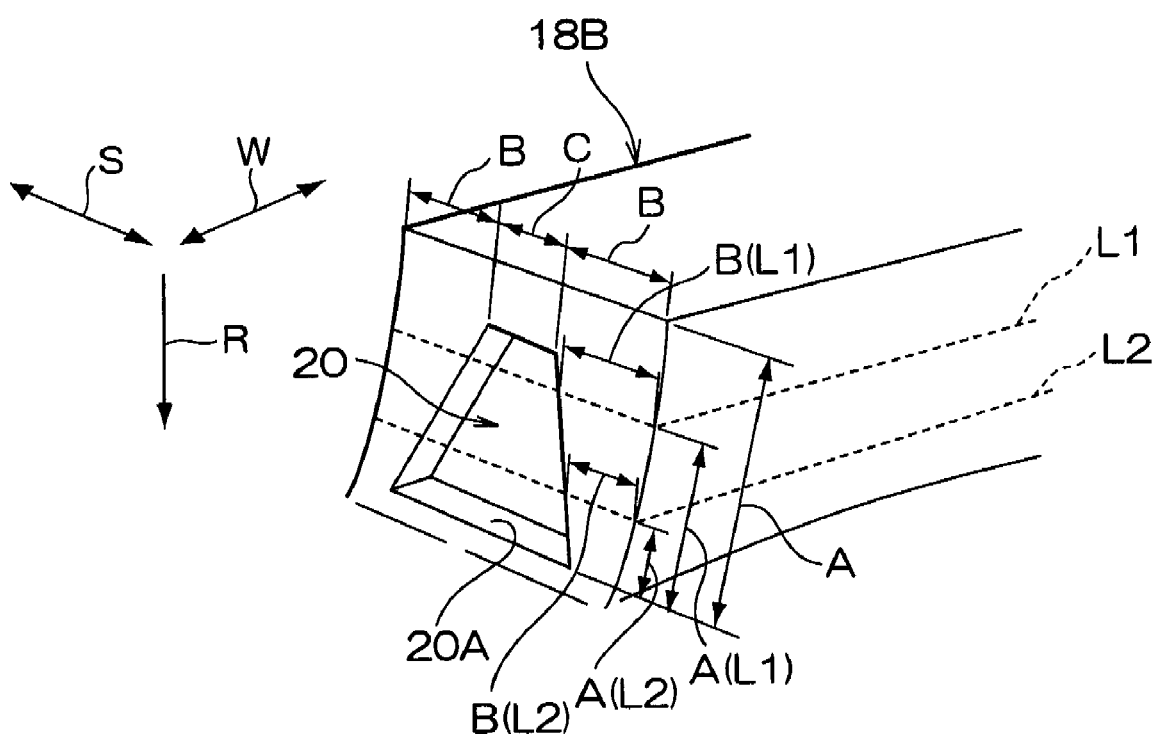
FIG. 2 is an enlarged perspective view of one of the blocks 18B and one of the recessed portions 20 of FIG. 1.

As shown in FIGS. 1 and 2, recessed portions 20 are provided in the wall surface at the outside in the tire width direction (direction of arrow W) of the outermost blocks 18B in the tire width direction, the recessed portions 20 being trapezoidal shaped when viewed from the tire width direction. These recessed portions 20 have a circumferential width C in the tire circumferential direction (direction of arrow S) that increases at a constant rate on progression from the tread surface side of the block 18B toward the inside in the tire radial direction (direction of arrow R). The centers of the recessed portions 20 in the tire circumferential direction align with the centers of the blocks 18B in the tire circumferential direction. Namely, the recessed portions 20 are symmetric about an axis of the center of the blocks 18B in the tire circumferential direction. Note that while in the present exemplary embodiment the shape of the recessed portions 20 is trapezoidal when viewed from the tire width direction, other shapes may be used as long as the circumferential width C of the recessed portions 20 increases at a constant rate.

As shown in FIG. 2, if the length between the tread surface and the innermost end portion 20A of the recessed portion 20 in the tire radial direction is designated A, and the length in the tire circumferential direction of the region between the recessed portion 20 of the block 18B and the lateral groove 16, in the range from the tread surface of the block 18B up to 80% of the depth of the lateral groove 16, is designated B, then it is preferable that 0.8<B/A<2.5 is satisfied.

Figure 4A:
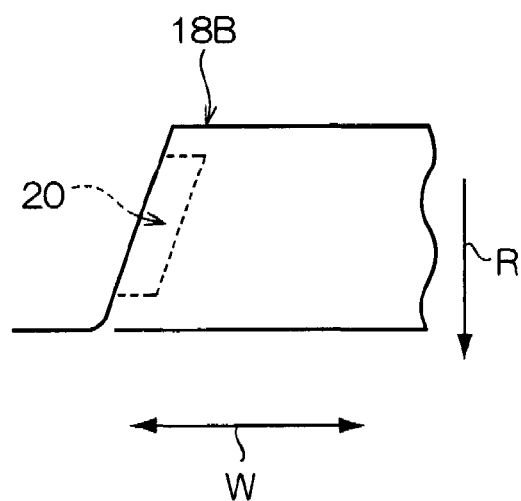
FIG. 4A is a view of a recessed portion with a recessed portion depth that is the same at the outside in the tire radial direction and at the inside in the tire radial direction, as seen from a wall surface of the block on a tire circumferential direction side.
Figure 4B:
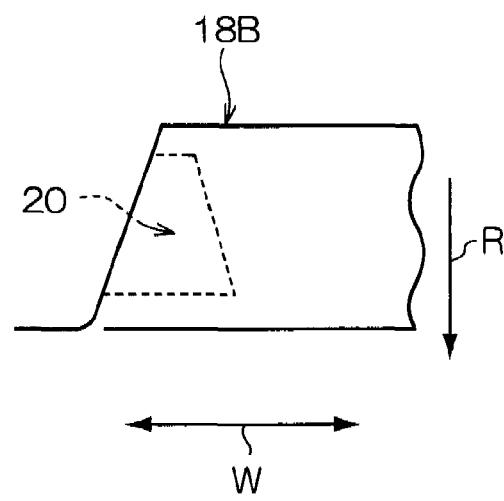
FIG. 4B is a view of a recessed portion with a recessed portion depth that is deeper at the inside in the tire radial direction than at the outside in the tire radial direction, as seen from a wall surface of the block on a tire circumferential direction side.

Preferably the depth of the recessed portion 20, in a lateral cross-section of the block 18, is either the same at the outside in the tire radial direction as at the inside in the tire radial direction (see FIG. 4A), or the depth at the inside in the tire radial direction is deeper than at the outside in the tire radial direction (see FIG. 4B). Note that while in the present exemplary embodiment, as shown in FIG. 4A, the depth of the recessed portion 20 is configured to be the same at the outside in the tire radial direction as at the inside in the tire radial direction, in other exemplary embodiments configurations may also be made with the depth of the recessed portion 20 at the inside in the tire radial direction deeper than at the outside in the tire radial direction, as shown in FIG. 4B.

Also, while the provision of a recessed portion in the blocks is essential for the pneumatic tire of the present invention, there are no particular limitations to structures other than this or to the materials etc. of the tire, and these may be appropriately selected in the usual way.

The dotted line L1 on the block 18 in FIG. 2 shows the position of the tread surface at a partially worn state, and the dotted line L2 shows the portion of the tread surface at a fully worn state. Correspondingly the block 18B seen from the tread surface is shown when new in FIG. 3A, partially worn (dotted line L1) in FIG. 3B, and fully worn (dotted line L2) in FIG. 3C.

Operation

Explanation will now be given of operation of the tire 10 of the first exemplary embodiment.

Figure 3A:
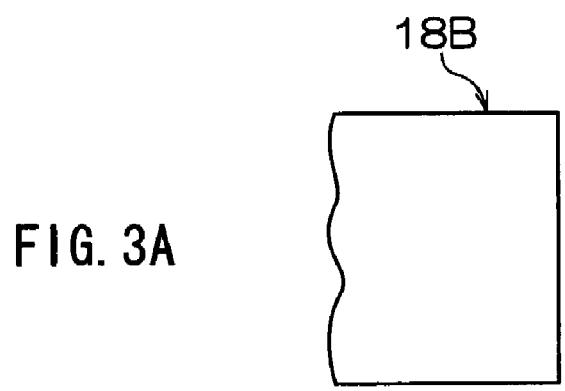
FIG. 3A is a plan view showing a new state of the block 18B of FIG. 2.

As shown in FIG. 2 and FIG. 3A, when the tire 10 is new an edge effect is obtained since the ratio of the circumferential direction length B of the block 18B to the gauge A of the block 18B is small, and excellent traction performance is obtained.

Figure 3B:
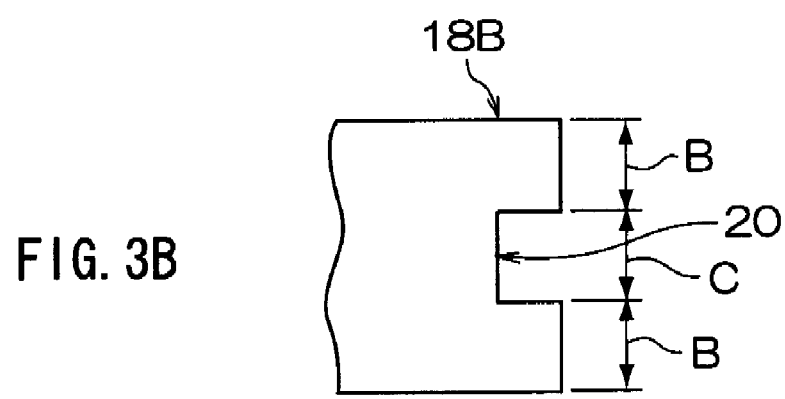
FIG. 3B is a plan view showing a partially worn state of the block 18B of FIG. 2.
Figure 3C:
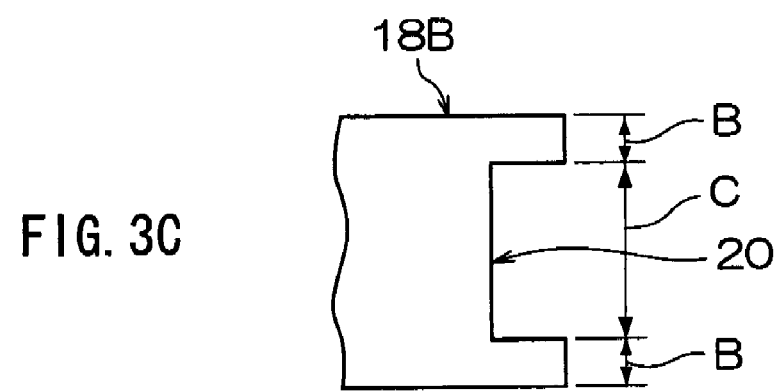
FIG. 3C is a plan view showing a fully worn state of the block 18B of FIG. 2.

Next, when wear of the block 18B progresses up to the dotted line L1 shown in FIG. 2 (partially worn), the recessed portion 20 opens to the tread surface of the block 18B, and short block portions appear, as shown in FIG. 3B, at regions of the block 18B between the lateral groove 16A and the recessed portion 20. Since partial wear of the block 18B is reached at this stage, the ratio of the circumferential direction length of the block 18B to the gauge of the block 18B becomes larger. In contrast, since the ratio of the circumferential direction length of the short block portions to the gauge of the short block portions is small, an excellent edge effect is obtained. An excellent edge effect for the block 18B as a whole is consequently maintained at a partially worn state, maintaining excellent traction performance.

When wear of the block 18B progresses to the dotted line L2 shown in FIG. 2 (fully worn) the ratio of the circumferential direction length of the block 18B to the gauge of the block 18B becomes even larger. In contrast, since the circumferential width C of the recessed portion 20 increases from the tread surface side of the block 18B to the inside in the tire radial direction, the state of the ratio of the circumferential direction length of the short block portions to the gauge of the short block portions is always maintained small, and an excellent edge effect is also obtained even at the fully worn state. Consequently an excellent edge effect of the block 18B as a whole is maintained even at the fully worn state, maintaining excellent traction performance.

Due to the above, an excellent edge effect is maintained for the entire life of the tire 10, and excellent traction performance is maintained for the entire life of the tire 10.

Wear of the edge is greater at the outside of the blocks in the tire width direction due to the input of sideways forces etc. thereto, and this is particularly significant at the outermost blocks in the tire width direction. Therefore, a sufficient effect is obtained even by only providing the recessed portion 20 on the wall surface at the tire width direction outside of the blocks 18B located at the outermost positions in the tire width direction.

If $B/A \geq 2.5$ then sufficient edge effect is not obtained, with a fall off in the traction performance, and if $0.8 \geq B/A$ then the block chunking properties worsen. The relationship of A and B therefore preferably satisfies $0.8 < B/A < 2.5$.

When the depth of the recessed portion 20 is shallower at the inside in the tire radial direction than at the outside in the tire radial direction, then the depth of the recessed portion 20 becomes shallower as wearing progresses, and sufficient edge effect becomes unobtainable. The depth of the recessed portion 20 is therefore preferably either the same at the outside in the tire radial direction as at the inside in the tire radial direction (see FIG. 4A), or is deeper at the inside in the tire radial direction than at the outside in the tire radial direction (see FIG. 4B).

Second Exemplary Embodiment

Configuration

Figure 5:
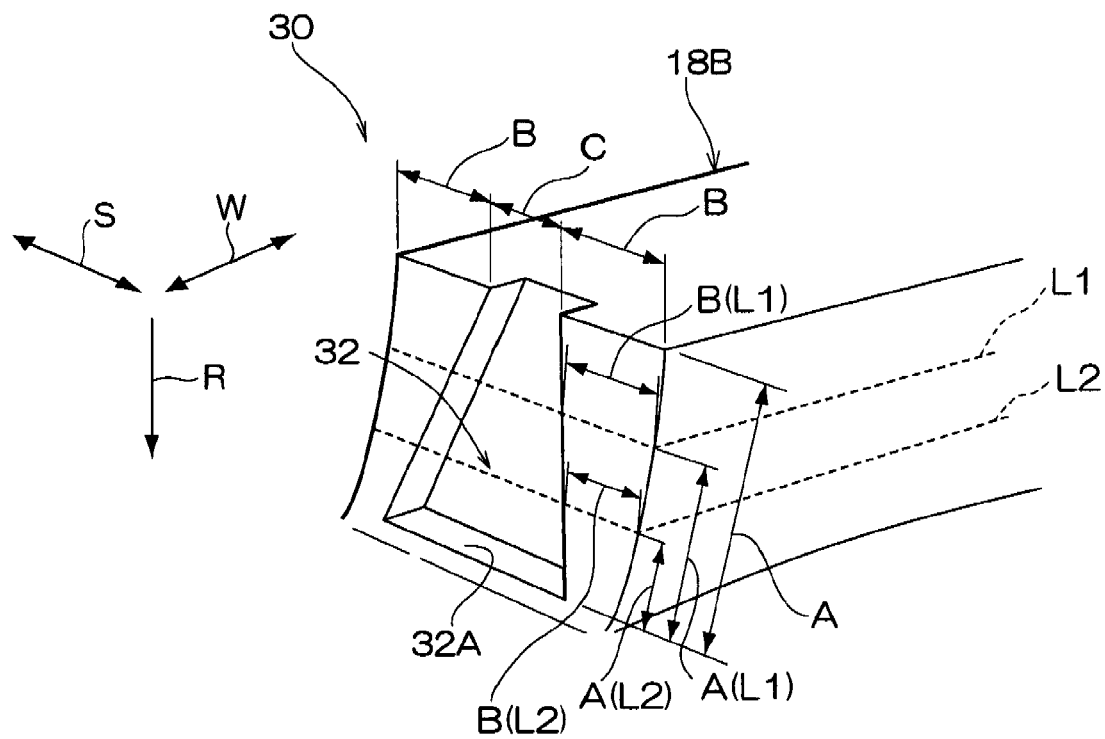
FIG. 5 is an enlarged perspective view of a block 18B and a recessed portion 32 of a pneumatic tire according to a second exemplary embodiment.

Explanation will now be given of a second exemplary embodiment of a pneumatic tire of the present invention. The pneumatic tire 30 of the present exemplary embodiment (referred to simply as tire 30 below) differs from the first exemplary embodiment in that recessed portions 32 of the block 18 are open to the tread surface at the outside in the tire radial direction when the tire 30 is new, as shown in FIG. 5. The same reference numerals are attached to similar configurations to those of the first exemplary embodiment, and explanation thereof is omitted. The recessed portion 32 is trapezoidal in shape when seen from the outside in the tire width direction, and reference numeral 32A in FIG. 5 indicates the innermost end portion of the recessed portion 32 in the tire radial direction.

Operation

In the second exemplary embodiment there are the following operations in addition to those of the first exemplary embodiment.

At the initial wear stage, since the recessed portions 32 of the block 18 are open to the tread surface, an even better edge effect is obtained in comparison to a tire in which the recessed portions 32 are not open to the outside in the tire radial direction (tire 10 of the first exemplary embodiment), and even better traction performance is obtained.

Third Exemplary Embodiment

Configuration

Figure 7:
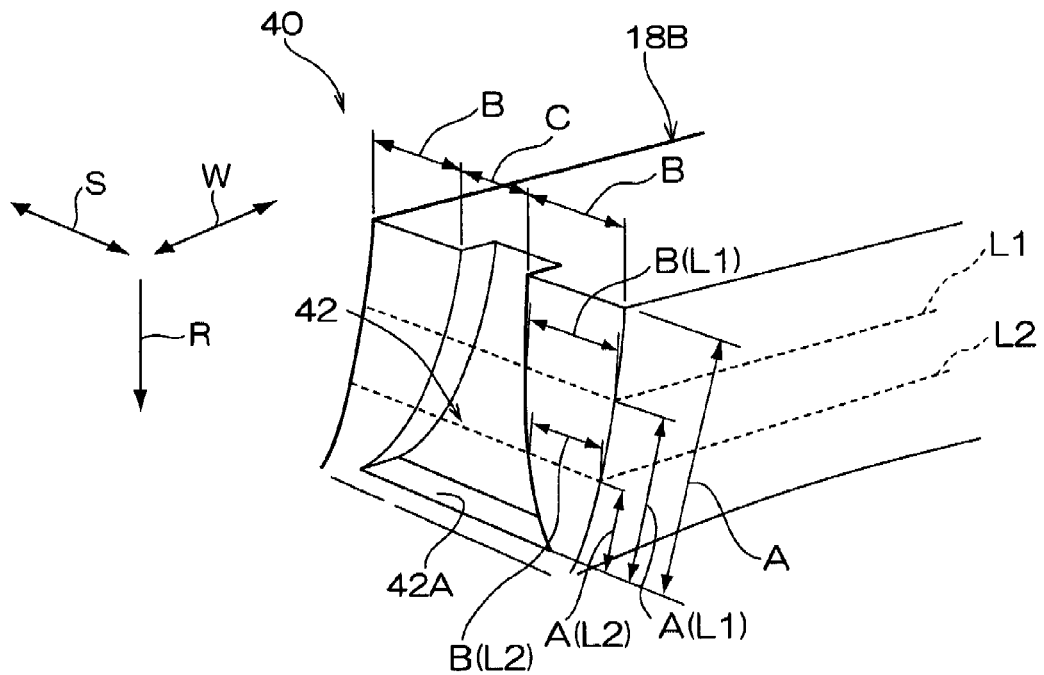
FIG. 7 is an enlarged perspective view of a block 18B and a recessed portion 42 of a pneumatic tire according to a third exemplary embodiment.

Explanation will now be given of a third exemplary embodiment of the present invention. The pneumatic tire 40 of the present exemplary embodiment (referred to simply as tire 40 below) differs from the first exemplary embodiment in the shape of the recessed portion when seen from the tire width direction, as shown in FIG. 7. The same reference numerals are attached to similar configurations to those of the first exemplary embodiment, and explanation thereof is omitted.

Figure 8:
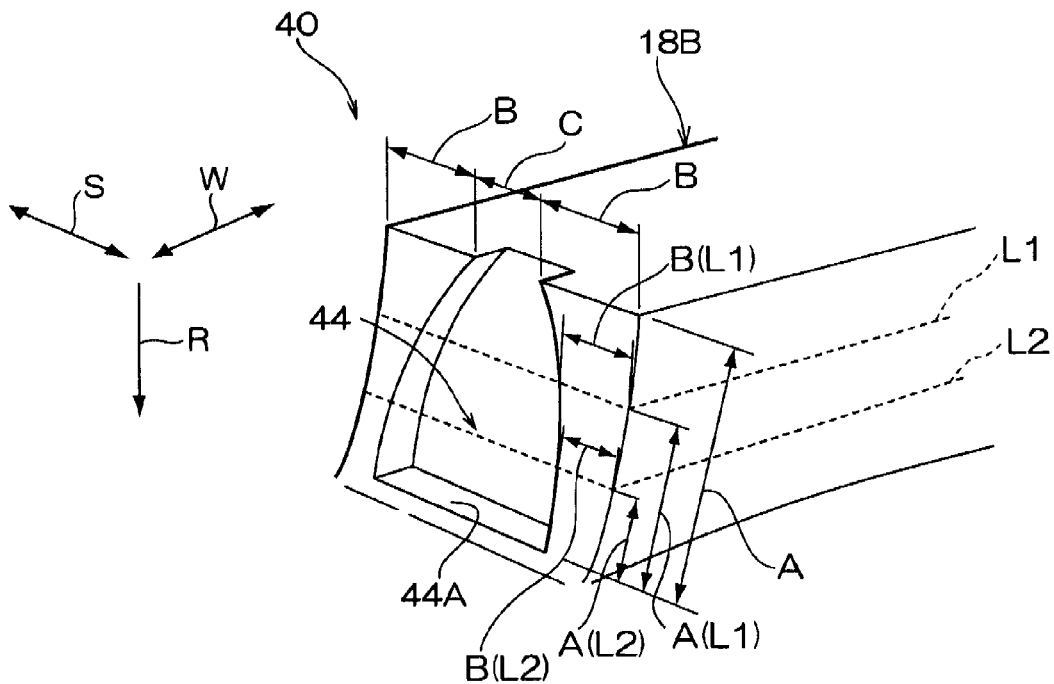
FIG. 8 is an enlarged perspective view of a block 18B and a recessed portion 44 of a pneumatic tire according to another exemplary embodiment.

The recessed portion 42 of the present exemplary embodiment, as shown in FIG. 7, is shaped as seen from the tire width direction such that the angled sides of the (trapezoidal) recessed portion 20 of the first exemplary embodiment are shaped so as to bow inward. Therefore the recessed portion 42 is configured to increases in circumferential width C in the tire circumferential direction (direction of arrow S) from the tread surface side of the block 18B toward the inside in the tire radial direction (direction of arrow R), but the rate of increase is not constant. It should be noted that the recessed portion 42 of the present exemplary embodiment is shaped so that the angled sides of a trapezoid are shaped so as to bow inward, as shown in FIG. 7, however there is no requirement to limit the present invention to so such a configuration (shape). The present exemplary embodiment requires that the increase in the circumferential width C is not uniform, and therefore, for example, the angled sides of the recessed portion 20 of the first exemplary embodiment shaped so as to bow outward (shaped as the recessed portion 44 shown in FIG. 8), or another shape may be adopted. Reference numeral 42A in FIG. 7 indicates the innermost end portion of the recessed portion 42 in the radial direction, and reference numeral 44A in FIG. 8 indicates the innermost end portion of the recessed portion 44 in the radial direction.

Operation

In the third exemplary embodiment there are the following operations in addition to those of the first exemplary embodiment.

The aim of the present invention is to maintain the edge effect by changing the circumferential direction length of the short block portions. There are, however, cases when the optimum short block portion circumferential direction length does not always have a proportional relationship to the gauge of the short block portions, due to the hardness of the tread rubber and the base rubber etc. In such cases the optimum short block portion circumferential direction length can be obtained by changing the rate of increase in the circumferential width C of the recessed portion.

Fourth Exemplary Embodiment

Configuration

Figure 9:
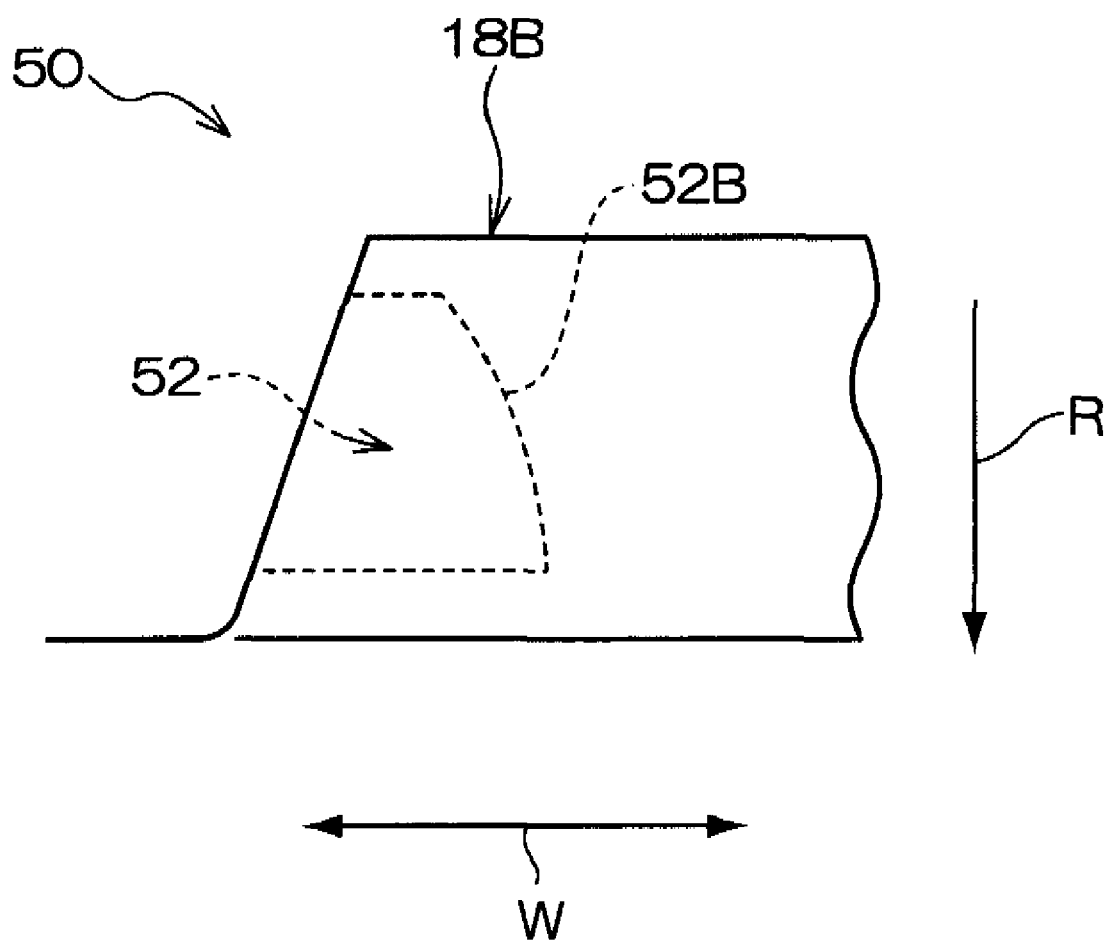
FIG. 9 is an enlarged perspective view of a block 18B of a pneumatic tire according to a fourth exemplary embodiment, as seen from the wall surface at one end in the tire circumferential direction.

Explanation will now be given of a fourth exemplary embodiment of a pneumatic tire of the present invention. The pneumatic tire 50 of the present exemplary embodiment (referred to simply as tire 50 below) differs from the first exemplary embodiment in that an end face 52B of a recessed portion 52 bows toward the block inside, as shown in FIG. 9. The depth of the recessed portion 52 of the present exemplary embodiment also, as shown in FIG. 9, is configured so as to get deeper from the tread surface side toward the inside in the tire radial direction, however it is not necessary to limit the present invention to such a configuration. The same reference numerals are attached to similar configurations to those of the first exemplary embodiment, and explanation thereof is omitted.

Operation

In the fourth exemplary embodiment there are the following operations in addition to those of the first exemplary embodiment.

In the tire 50 the end face 52B of the recessed portion 52 is shaped so as to bow toward the inside of the block, namely the end face 52B has a circular arc shape, therefore when the recessed portion 52 is exposed through wear, the rubber of the block 18B at the end face 52B is suppressed from deforming so as to bulge out in the tire width direction, suppressing excessive falling off of the compression rigidity at the end portions in the tire width direction of the tread 12, and a high edge effect can be achieved.

Other Exemplary Embodiments

In the first to the fourth exemplary embodiments, configuration is made such that recessed portions (20, 42, 44, 52) are only provided in the wall surface at the outside in the tire width direction of the blocks 18B, however there is no requirement to limit to such a configuration.

Configuration may be made with the recessed portions provided to the wall surface at the inside in the tire width direction of the block 18B, or at the wall surfaces at both sides in the tire width direction of the blocks 18B, and/or with the recessed portions being provided to one or more of the wall surfaces at the two sides in the tire width direction of the blocks 18A. By providing the recessed portions at two or more of the total four wall surfaces, the two wall surfaces in the tire width direction of the blocks 18A and the two wall surfaces in the tire width direction of the blocks 18B, an even better edge effect is obtained, and even better traction performance is both obtained and maintained.

When providing the recessed portions at two or more of the two wall surfaces in the tire width direction of the blocks 18A and the two wall surfaces in the tire width direction of the blocks 18B, the length between the end portion at the innermost face in the tire radial direction of the recessed portion and the tread surface thereof is preferably set with the length of the recessed portions on the outside in the tire width direction longer than the length of the recessed portions on the inside in the tire width direction. This is because the edges of blocks on the outside in the tire width direction are more readily worn by input of side forces or the like, with a large reduction in the edge effect, and this can be balanced out by configuring as described above.

The tread pattern of the exemplary embodiment described above is of a pattern configured so as to be a rotationally symmetrical pattern with an axis of symmetry of the equatorial plane CL, however the present invention is not necessarily limited to such a pattern configuration, and a pattern may be configured laterally symmetric with respect to the equatorial plane CL, a so-called rotation direction specified pattern.

Explanation has been given of embodiments of the present invention by way of the above exemplary embodiments, however these exemplary embodiments are only examples and various modifications can be made within the spirit of the present invention. It is to be understood that the scope of the rights of the present invention is not limited to these exemplary embodiments.

Examples

In order to confirm the performance enhancement effect of the pneumatic tire of the present invention a sample pneumatic tire applied with the first exemplary embodiment of the present invention, a sample pneumatic tire applied with the second exemplary embodiment of the present invention, three comparative example sample pneumatic tires, and a conventional pneumatic tire sample were prepared. These sample tires where each mounted to a dump-truck for construction use, and tests of hill climbing ability were performed on a test track (unpaved track).

The evaluation of hill climbing ability was an evaluation of the acceleration when driving up an inclined track of constant gradient. In order to see the effect of changes in the tread gauge due to wear, tests were carried out on tires when new, and with changes to the tread surface simulated by buffing away to give a partially worn state (buffing away ⅓ of the tread gauge as new), and to give a fully worn state (buffing away ⅔ of the tread gauge as new). After running for 30 000 km, chunking properties were evaluated by the largest cracks in the end portion at the innermost face in the tire radial direction of the recessed portions, or at the groove bottoms of the lateral grooves.

Figure 6:
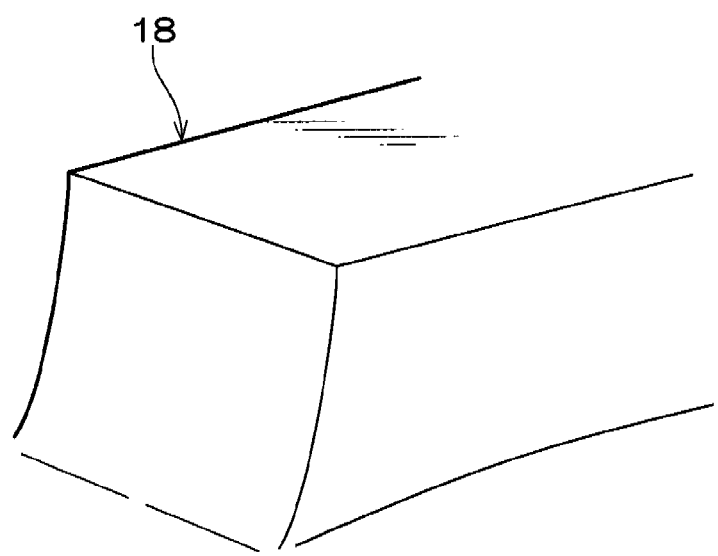
FIG. 6 is an enlarged perspective view of a block of a related tire example.

First, as the samples, the conventional sample (see FIG. 6) and the later described Examples 1 and 2 were produced, and as the comparative examples a sample in which the circumferential width of the recessed portions does not change in the tire radial direction (Comparative Example 1), a sample in which the ratio of the circumferential length of the portion demarcated by the recessed portion and the lateral groove, to the distance from the tread surface to the end portion at the innermost face of the recessed portion in the tire radial direction is 2.5 or above (Comparative Example 2), and a sample in which this distance ratio was 0.8 or below (Comparative Example 3) were produced. Note that in all the tires the depth of the lateral grooves is 100 mm, and the circumferential length of the blocks demarcated by the lateral grooves is 240 mm.

The results of the test are shown as an index in Table 1, with the traction performance of the conventional example when new set at 100, a higher index of traction performance indicates better the traction performance. With respect to chunking properties, a smaller length of cracks indicates excellent performance.

The test conditions are as follows. The test tire size in all cases is 40.00R57, a pneumatic tire for heavy loads. The rim size to which these test tires were fitted is 29.00×57, and after fitting the test tires air is filled so as to give an internal pressure of 700 kpa. The vehicle used for the tests is a dump-truck for construction use, as stated above, with the fitted position of the test tires being the driven wheels (the rear wheels). The running distance for the evaluation of chunking is about 30 000 km, with the track surface on which the test were carried out being non-paved.

TABLE 1

|  | Example 1 | Example 2 | Conventional Example | Comparative Example 1 | Comparative Example 2 | Comparative Example 3 |
| --- | --- | --- | --- | --- | --- | --- |
| Distance of the recessed portion from tread surface (mm) | 20 | 0 | — | 20 | 20 | 20 |
| Recessed portion circumferential width at nearest position to tread surface (mm) | 80 | 40 | — | 40 | 40 | 120 |

TABLE 1-continued

| | Example 1 | Example 2 | Conventional Example | Comparative Example 1 | Comparative Example 2 | Comparative Example 3 |
|---|---|---|---|---|---|---|
| Circumferential length of portion demarcated by recessed portion and the lateral groove at the above position (mm) | 80 | 100 | 240 | 100 | 100 | 60 |
| Ratio of circumferential length of above portion to the distance from the tread surface to the (end) portion at the innermost face of the recessed portion in the tire radial direction | 1 | 1 | — | 1.25 | 1.25 | 0.75 |
| Circumferential width of the recessed portion at the position of 80% of the depth of the block from the tread surface (mm) | 200 | 200 | — | 40 | 120 | 210 |
| Circumferential length of portion demarcated by recessed portion and lateral groove at the above position (mm) | 20 | 20 | — | 100 | 80 | 15 |
| Ratio of circumferential length of above portion to the distance from the tread surface to the (end) portion at the innermost face of the recessed portion in the tire radial direction | 1 | 1 | — | 5 | 3 | 0.75 |
| Traction performance (when new) | 99 | 102 | 100 | 99 | 97 | 88 |
| Crack in the innermost position of the recessed portion in the tire radial direction in the above state (mm) | 5.5 | 5.5 | 5.0 | 5.2 | 5.3 | 6.3 |
| Traction performance (at 3/5 tread gauge) | 96 | 96 | 90 | 85 | 81 | 83 |
| Crack in the innermost position of the recessed portion in the tire radial direction in the above state (mm) | 4.5 | 4.6 | 4.3 | 4.4 | 4.3 | 5.2 |
| Traction performance (at 1/5 tread gauge) | 81 | 90 | 75 | 83 | 80 | 90 |
| Crack in the innermost position of the recessed portion in the tire radial direction in the above state (mm) | 3.7 | 3.8 | 3.5 | 3.6 | 3.6 | 4.5 |

It can be seen from the results of Table 1 that Example 1 and Example 2 have raised traction performance during the partially worn state up to the fully worn state, in comparison to the Conventional Example. It can be seen from the Comparative Example 1 that the traction performance, particularly at the fully worn state, falls off when the circumferential width of the recessed portion is constant in the radial direction. It can also be seen from Comparative Example 2 and Comparative Example 3 that there is only a small increase in traction performance of tires with portions demarcated by the recessed portion and the lateral groove having a ratio of 2.5 or above for the circumferential length to the distance from the portion at the outermost side of the recessed portion in the tire radial direction, and that chunking of the blocks worsens when the ratio is 0.8 or below.

Industrial Applicability

As stated above, the pneumatic tire according to the present invention is particularly applicable to construction vehicles used in mining or at construction sites.

Explanation of the Reference Numerals

| | |
|---|---|
| 10 | tire (pneumatic tire) |
| 12 | tread |
| 14 | circumferential groove |
| 16 | lateral groove |
| 18 | block |
| 20 | recessed portion |
| 30 | tire (pneumatic tire) |
| 32 | recessed portion |
| 40 | tire (pneumatic tire) |
| 42 | recessed portion |
| 44 | recessed portion |
| 50 | tire (pneumatic tire) |
| 52 | recessed portion |
| C | circumferential width |
| A | length |

The invention claimed is:

1. A pneumatic tire comprising:
blocks, demarcated by a circumferential groove formed in the tread and lateral grooves crossing the circumferential groove; and
a recessed portion formed in at least one of the wall surfaces at the two ends in the tire width direction of each of the blocks, the circumferential width of the recessed portion increasing from the tread surface side of the block toward the inside of the tire radially,
wherein if the length between the innermost end portion of the recessed portion in the tire radial direction and the tread surface is designated A, and the length in the tire circumferential direction of a region between the recessed portion of the block and the lateral groove in the range from the tread surface of the block up to 80% of the depth of the lateral groove is designated B, then $0.8 < B/A < 2.5$ is satisfied.

2. The pneumatic tire of claim 1, wherein the length between an end portion at the innermost side of the recessed portion in the tire radial direction and the tread surface is longer at the recessed portions at the outside in the tire width direction than at the recessed portions at the inside in the tire width direction.

3. The pneumatic tire of claim 1, wherein the recessed portion is only formed on an outside wall surface in the tire width direction of the blocks that are at the outermost position in the tire width direction.

4. The pneumatic tire of claim 1, wherein the increase in circumferential width of the recessed portion toward the inside in the tire radial direction is not at a constant rate.

5. The pneumatic tire of claim 1, wherein, in a lateral cross-section of the tire, either the depth of the recessed portion is the same at the outside in the tire radial direction as at the inside in the tire radial direction, or the depth is deeper at the inside in the tire radial direction than at the outside in the tire radial direction.

6. The pneumatic tire of claim 1, wherein at least one portion of the recessed portion has a circular arced shape in a lateral cross-section of the tire.

* * * * *